United States Patent
Andres et al.

(10) Patent No.: US 9,421,891 B2
(45) Date of Patent: Aug. 23, 2016

(54) ADJUSTMENT DRIVE FOR AN ADJUSTMENT DEVICE OF A MOTOR VEHICLE SEAT

(75) Inventors: Christian Andres, Wiesenthal (DE);
Gregor Kroener, Bischberg (DE);
Bernd Muenekhoff, Ebersdorf (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 575 days.

(21) Appl. No.: 13/819,709

(22) PCT Filed: Aug. 27, 2011

(86) PCT No.: PCT/EP2011/004313
§ 371 (c)(1),
(2), (4) Date: Mar. 28, 2013

(87) PCT Pub. No.: WO2012/028283
PCT Pub. Date: Mar. 8, 2012

(65) Prior Publication Data
US 2013/0180348 A1    Jul. 18, 2013

(30) Foreign Application Priority Data

Aug. 31, 2010 (DE) .......................... 10 2010 040 048
May 3, 2011 (DE) .......................... 10 2011 075 183

(51) Int. Cl.
*F16H 37/04* (2006.01)
*F16H 57/02* (2012.01)
(Continued)

(52) U.S. Cl.
CPC ............ *B60N 2/4435* (2013.01); *B60N 2/0232* (2013.01); *B60N 2/2252* (2013.01);
(Continued)

(58) Field of Classification Search
CPC .. B60N 2/22; B60N 2/225; B60N 2002/0236; B60N 2/2252; F16H 2001/326; F16H 3/70

USPC .......... 74/606 R, 724, 89.14, 89.16; 297/362, 297/362.11, 362.12; 475/162

See application file for complete search history.

(56) References Cited

U.S. PATENT DOCUMENTS

| 4,281,566 A | 8/1981 | Brusasco |
| 4,802,374 A | 2/1989 | Hamelin et al. |

(Continued)

FOREIGN PATENT DOCUMENTS

| AT | 130523 | 11/1932 |
| CH | 493 759 | 8/1970 |

(Continued)

OTHER PUBLICATIONS

English translation of the International Preliminary Report on Patentability for corresponding PCT/EP2011/004313, dated Mar. 5, 2013, 7 sheets.

(Continued)

*Primary Examiner* — Ha D Ho
(74) *Attorney, Agent, or Firm* — Lewis Roca Rothgerber Christie LLP

(57) ABSTRACT

An adjustment drive for an adjusting device of a motor vehicle seat includes a drive motor, a two-stage reduction gear and a housing for mounting a drive motor and for accommodating the two-stage reduction gear. The gear elements of the first reduction gear stage are arranged in a housing shell of the housing, which can be closed by a housing cover. In a front-end assembly connectable with the housing shell at least a part of the gear elements of the second reduction gear stage is arranged between the housing cover and a cover plate or cover and guide plate connected with the housing cover and is supported in axial direction.

20 Claims, 17 Drawing Sheets

(51) Int. Cl.
  *B60N 2/44* (2006.01)
  *B60N 2/02* (2006.01)
  *B60N 2/225* (2006.01)
  *F16H 1/32* (2006.01)
  *F16H 19/00* (2006.01)
  *F16H 1/16* (2006.01)

(52) U.S. Cl.
  CPC ............... *F16H 1/32* (2013.01); *F16H 19/00* (2013.01); *F16H 37/041* (2013.01); *B60N 2002/024* (2013.01); *B60N 2002/0236* (2013.01); *F16H 1/16* (2013.01); *F16H 2001/326* (2013.01); *Y10T 74/188* (2015.01); *Y10T 74/18792* (2015.01)

(56) References Cited

U.S. PATENT DOCUMENTS

| | | | |
|---|---|---|---|
| 5,005,906 | A | 4/1991 | Suzuki et al. |
| 5,350,216 | A | 9/1994 | Ito |
| 6,280,359 | B1 | 8/2001 | Moskob |
| 6,533,356 | B2 | 3/2003 | Teufel |
| 6,543,850 | B1 | 4/2003 | Becker et al. |
| 6,579,203 | B2 | 6/2003 | Wang et al. |
| 7,041,024 | B2 | 5/2006 | Becker et al. |
| 7,640,828 | B2 * | 1/2010 | Sakamaki ............ B60N 2/0232 297/344.17 |
| 2004/0254041 | A1 | 12/2004 | Becker et al. |
| 2006/0084547 | A1 | 4/2006 | Dill et al. |
| 2006/0117890 | A1 | 6/2006 | Li et al. |
| 2009/0045661 | A1 | 2/2009 | Stoessel et al. |
| 2009/0072602 | A1 | 3/2009 | Schuler |
| 2009/0230753 | A1 | 9/2009 | Breitfeld et al. |
| 2010/0024583 | A1 * | 2/2010 | Kawakubo ............ B62D 3/123 74/422 |
| 2010/0320823 | A1 | 12/2010 | Thiel |
| 2012/0223562 | A1 | 9/2012 | Assmann et al. |

FOREIGN PATENT DOCUMENTS

| | | |
|---|---|---|
| CN | 101356073 A | 1/2009 |
| DE | 1 223 218 | 8/1966 |
| DE | 2 151 340 | 4/1973 |
| DE | 29 02 813 | 8/1979 |
| DE | 29 31 894 A1 | 8/1979 |
| DE | 29 02 429 A1 | 7/1980 |
| DE | 31 29 672 C1 | 10/1982 |
| DE | 32 14 592 A1 | 10/1983 |
| DE | 37 29 134 A1 | 3/1989 |
| DE | 41 27 051 A1 | 2/1993 |
| DE | 42 09 652 C1 | 4/1993 |
| DE | 42 17 554 C2 | 12/1993 |
| DE | 44 37 073 A1 | 1/1996 |
| DE | 196 17 227 C1 | 10/1997 |
| DE | 197 15 626 A1 | 1/1998 |
| DE | 197 12 185 C1 | 3/1998 |
| DE | 198 03 747 A1 | 8/1999 |
| DE | 199 56 901 A1 | 5/2001 |
| DE | 100 18 108 C2 | 10/2001 |
| DE | 102 01 173 A1 | 9/2002 |
| DE | 10 2004 040 602 A1 | 10/2005 |
| DE | 20 2006 004 613 U1 | 4/2007 |
| DE | 10 2005 057 462 A1 | 6/2007 |
| DE | 10 2006 023 536 A1 | 11/2007 |
| DE | 103 27 103 B4 | 12/2007 |
| DE | 198 61 278 B4 | 12/2007 |
| DE | 10 2006 042 273 B4 | 3/2008 |
| DE | 10 2006 058 661 A1 | 7/2008 |
| DE | 20 2007 009 839 U1 | 12/2008 |
| DE | 20 2007 011 851 U1 | 2/2009 |
| DE | 10 2007 041 602 A1 | 3/2009 |
| DE | 10 2008 061 691 A1 | 11/2009 |
| DE | 10 2008 038 581 A1 | 2/2010 |
| DE | 10 2009 043 847 A1 | 3/2010 |
| DE | 10 2009 041 491 A1 | 3/2011 |
| EP | 1 647 438 B1 | 4/2006 |
| JP | 4331850 A | 11/1992 |
| JP | 2001165248 A | 6/2001 |
| WO | WO 2005/097540 A2 | 10/2005 |
| WO | WO 2011/029521 A2 | 3/2011 |

OTHER PUBLICATIONS

International Search Report of corresponding PCT/EP2011/004313, dated Dec. 21, 2011, 4 pages.

Chinese Office action and English translation for Application No. 201180042169.8, dated Jan. 6, 2015, 22 pages.

* cited by examiner

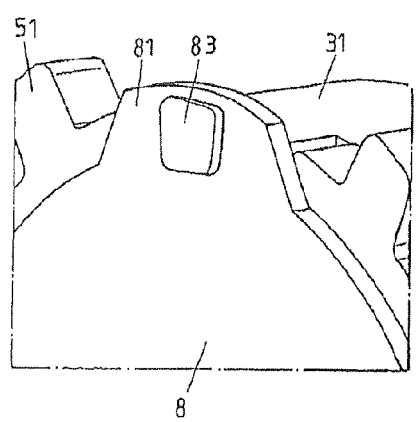
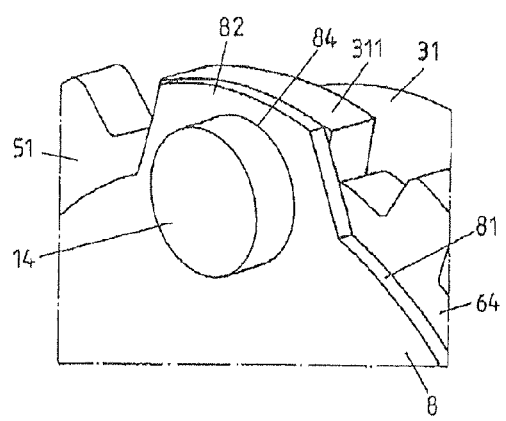
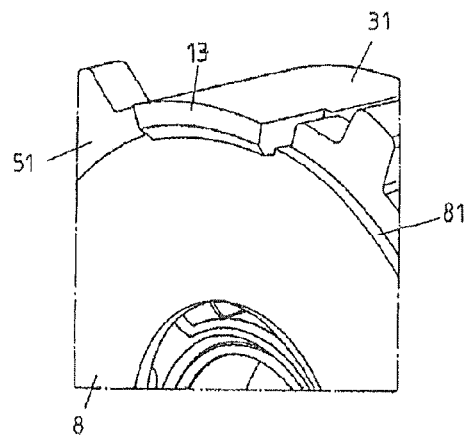

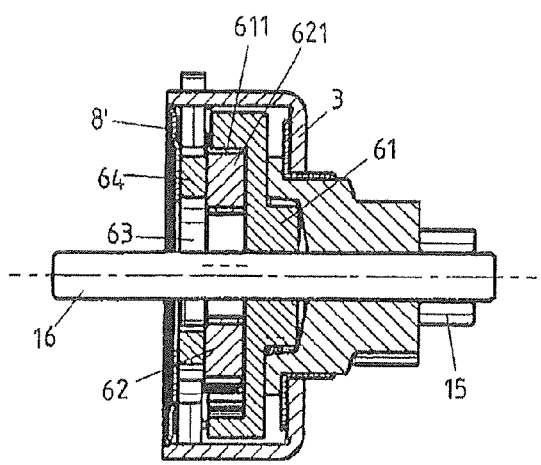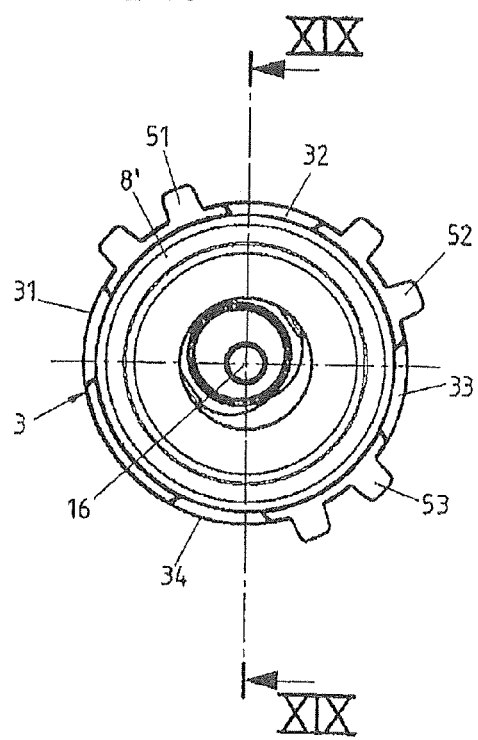

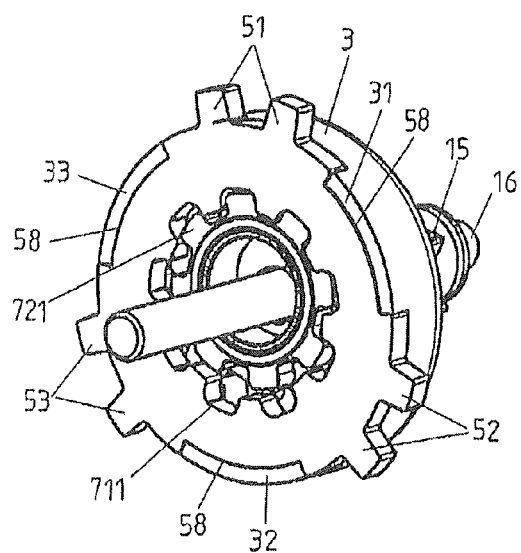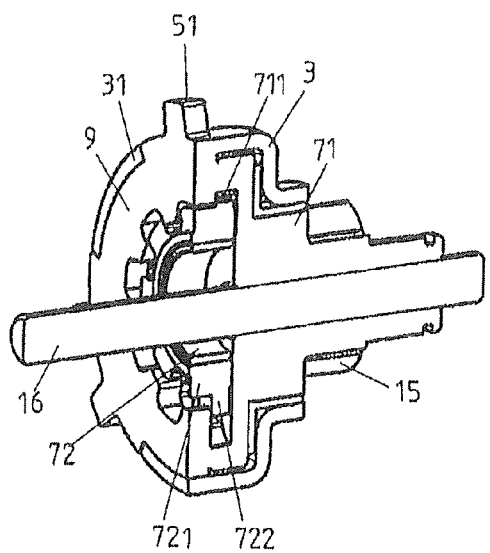

ADJUSTMENT DRIVE FOR AN ADJUSTMENT DEVICE OF A MOTOR VEHICLE SEAT

CROSS-REFERENCE TO A RELATED APPLICATION

This application is a National Phase Patent Application of International Patent Application Number PCT/EP2011/004313, filed on Aug. 27, 2011, which claims priority of German Patent Application Number 10 2010 040 048.3, filed on Aug. 31, 2010 and of German Patent Application Number 10 2011 075 183.1, filed on May 3, 2011.

BACKGROUND

This invention relates to an adjustment drive for adjusting devices of a motor vehicle seat.

From DE 10 2004 040 602 A1 an actuating drive for an electric seat adjuster of a motor vehicle seat is known, which comprises a drive motor and a two-stage, self-locking reduction gear which converts a fast rotary drive movement of the drive motor into a reduced, slow rotary movement of a driven gear. The reduction gear has a housing with a lower part flange-mounted to the drive motor, an intermediate plate with a radial groove and a cover part which is screwed to the lower part by means of screws by interposition of the intermediate plate. The first, self-locking reduction stage of the reduction gear is formed by a worm-gear drive which contains a drive worm connected with the axis of rotation of the drive motor, which engages into a spur toothing of a spur gear. With the spur gear an eccentric of an eccentric gear forming the second reduction stage is connected, which includes a wobble gear, the driven gear cooperating with the wobble gear via a toothing, and a guide means for the wobble gear, which is non-rotatably held by means of the guide means and is enabled to carry out a wobbling movement on a circular path. The guide means comprises a guide arm molded to the wobble gear, which is shiftably and non-rotatably held in the radial groove of the intermediate plate in a radial direction relative to the circular path.

In the plurality of gear elements arranged axially one behind the other of the first and second reduction stage of the reduction gear and in the radial guidance of the wobble gear there is a risk that in particular with a high load the toothings can get out of engagement, which not only means an inoperability of the actuating drive, but above all a considerable risk of injury for the motor vehicle occupants in the case of a crash.

As an alternative to a radial guidance of the wobble gear, it is known from DE 41 27 051 A1 in a reduction gear formed as wobble or planetary gear system with an internally toothed ring gear connected with a driven shaft and with a planet gear whose external toothing partly is in engagement with the internal toothing of the ring gear, to use a cross-head slide for the horizontal and vertical guidance of the planet gear, which includes a vertically oriented oblong hole which at its ends merges into vertical slots, into which trunnions engage which are arranged diametrically to each other on the end face of the wobble gear. In horizontal legs of the cross-head slide two horizontal oblong holes aligned with each other are provided, into which trunnions firmly connected with a housing cover are immersed.

An alternative eccentric gear for the transmission fitting of a vehicle seat is known from EP 1 647 438 B1, in which on an eccentric connected with a carrier a planet gear with two concentric external toothings with different tip-circle diameters is arranged, of which the first external toothing meshes with the internal toothing of a frame-side ring gear and the second external toothing meshes with the internal toothing of an output-side ring gear. Since the number of teeth of the planet gear differs from that of the ring gears by at least one tooth and the respective outside diameter of the external toothing of the planet gear is smaller than the inside diameter of the frame-side or output-side ring gear by at least one tooth height, the planet gear performs gearing-up of the rotary movement, which is transmitted from the carrier via the eccentric to the planet gear.

SUMMARY

It is the object of the present invention to create an adjustment drive as mentioned above with a high crash resistance and a simple, inexpensive combination of different gear stages of the reduction gear.

The solution according to the invention provides an adjustment drive with high crash resistance as a result of the axial support of the part of the gear elements of the second gear stage combined in a pre-assembly and provides for an easy combination of the second gear stage of a reduction gear integrated in a pre-assembly with a housing shell which is connected with the drive motor and into which the first gear stage of the reduction gear is inserted, so that for example the pre-assembly containing the second gear stage of the reduction gear can be used for various seat adjusters and in dependence on the respective adjusting device of a motor vehicle seat different step-down ratios of the motor speed can be provided.

The inventive solution to arrange at least a part of the gear elements of the second reduction gear stage in a pre-assembly connectable with the housing shell and to axially support the gear elements by the housing cover and a cover plate or cover and guide plate connected with the housing cover ensures a meshing engagement even under great load and in particular also in the case of a crash, so that the flux of force from the adjusting device via the self-locking reduction gear to the drive motor is ensured and hence the maintenance of the adjusted seat position is ensured.

By axially securing the gear elements and fixing the pre-assembly, an inclined position of the gear wheels is prevented and the meshing engagement of the gear elements with each other, i.e. the tooth overlap, also is maintained in a load condition and in the case of a crash, so that constantly high forces can be transmitted. By means of additional measures, the anti-rotation protection and power transmission from the pre-assembly to the housing also can prevent the occurrence of rattling noise.

In a preferred exemplary embodiment, the housing shell includes flanges for accommodating the drive motor, a first recess for accommodating a first gear element of the first reduction gear stage connected with the motor shaft of the drive motor, and a second recess for accommodating a second gear element of the first reduction gear stage, which is in engagement with the first gear element of the first reduction gear stage, and a coupling element to the second reduction gear stage, which is connected with the second gear element of the first reduction gear stage.

This formation of the housing shell on the one hand ensures the meshing engagement of the gear elements of the first reduction gear stage, which are inserted into recesses correspondingly aligned to each other, so that even under high load the gear elements of the first reduction gear stage are fixed and hence the meshing engagement of the gear elements is ensured.

Due to a pot-like formation of the second recess and a substantially cylindrical outer contour of the pre-assembly, whose outside diameter is adapted to the inside diameter of the second recess, so that the pre-assembly is insertable flush into the second recess, a pre-positioning of the pre-assembly in the housing shell becomes possible. Alternatively or in addition, the pre-assembly can axially be fixed on the housing shell for safe transport.

Furthermore, for anti-rotation protection and power transmission to the housing shell, the pre-assembly can be inserted into the second recess or be connected with the housing shell with radial form fit and/or frictional contact.

In the completely assembled condition, the pre-assembly is axially clamped between the housing shell and the adjusting device and hence axially secured, wherein the gear elements of the first reduction gear stage are operatively connected with the gear elements of the second reduction gear stage arranged in the pre-assembly via the eccentric.

Preferably, the first reduction gear stage consists of a self-locking worm gear with a drive worm connected with the motor shaft of the drive motor and a helical gear in engagement with the toothing of the drive worm.

The self-retention of a worm gear used as first reduction gear stage effects an effective force absorption even with the introduction of high forces, as they occur in particular in the case of a crash.

Due to a bell-shaped formation of the housing cover with an opening for accommodating a bushing for the axial guidance of the gear elements of the second reduction gear stage integrated into the pre-assembly and for supporting the pinion, and with an edge opposite the opening which is connected with the cover plate or cover and guide plate, a compact construction is created, by which the pre-assembly is formed as laser welded assembly and can be manufactured easily and be fixed axially. This shape of the housing cover in addition provides for a protected arrangement of the gear elements of the second reduction gear stage and at the same time a fixation of the axial length of the pre-assembly, in order to axially secure the gear elements and hence ensure the meshing engagement even under great loads and in particular under an impact load.

Preferably, the pre-assembly contains gear elements of a wobble gear transmission with an internally toothed driven gear concentrically mounted on a shaft, a pinion connected with the driven gear for transmitting the output torque to a toothing means of the adjusting device, a wobble gear cooperating with the internal toothing of the driven gear, and a guide means for the wobble gear.

The use of a wobble gear transmission as second reduction gear stage provides for a suitably high transmission with little installation space, wherein the wobble gear is non-rotatably held with respect to the housing cover and hence with respect to the housing by means of the guide means and is guided on a circular path to perform a wobbling movement, without the wobble gear itself performing an intrinsic rotation. Due to the engagement of the external toothing of the wobble gear into the internal toothing of the driven gear, which only slightly differ in their number of teeth to achieve a high reduction effect, the rotatably mounted driven gear is rolling on the non-rotatably held wobble gear, wherein the number of revolutions of the driven gear is distinctly lower than the number of revolutions of the wobble gear. The guide means serves to prevent an intrinsic rotation of the wobble gear, but to permit a lateral displacement of the wobble gear in the plane on a circular path.

For this purpose, the guide means for the wobble gear according to a first embodiment consists of a cross-head slide, which with first guide elements aligned with each other engages in first counter-guide elements of the wobble gear aligned with each other, and a guide plate which with second guide elements aligned with each other and offset by 90° with respect to the first guide elements of the cross-head slide engages in second counter-guide elements of the cross-head slide aligned with each other and offset by 90° with respect to the first guide elements of the cross-head slide.

The use of a cross-head slide for guiding the wobble gear provides for an exact guidance of the wobble gear in the plane and a simple adjustment for securing the radial meshing engagement of the wobble gear with the toothing of the driven gear by dimensioning the guide elements and counter-guide elements.

The part of the gear elements of the second reduction gear stage belonging to the pre-assembly is arranged between the housing cover preferably formed pot- or bell-shaped and the cover plate, which is connected with the housing cover or with the guide plate, and in further embodiments can also be formed as axially resilient cover plate or as combined cover and guide plate.

The design of the cover plate as axially resilient cover plate not only serves for axially securing the pre-assembly, but also eliminates a possibly existing axial clearance between the gear elements of the pre-assembly, so that the overlap of the gear elements in engagement with each other is ensured and noise caused by an axial clearance cannot occur.

By a positive or non-positive connection of the axially resilient cover plate with the guide plate or the housing cover an easy assembly is ensured in addition, in that for example the axially resilient cover plate is pressed into the pot- or bell-shaped housing cover of the pre-assembly. Otherwise necessary connecting operations such as screwing, welding, riveting or the like thereby can be omitted. In addition, parts of the axially resilient cover plate at the same time form axial abutment surfaces for other components or for the housing containing the first reduction gear stage.

In a preferred aspect, the peripheral edge of the axially resilient cover plate is interlocked with the outer contour, for example with the segment arms of the housing cover, wherein the interlocking geometry can be effected depending on the necessary pressing force in different angles of attack or degrees of overlap with respect to the surrounding parts.

By applying welding seams arranged offset to each other at the circumference of the cover plate and the guide plate, an additional connection is created between the cover plate and the guide plate, which prevents rattling noise due to manufacturing inaccuracies and necessary tolerances.

As an alternative to the cohesive connection of the edge of the cover plate or the cover and guide plate with the welding seams arranged in the region of the segment arms of the housing cover, the pre-assembly also can be connected by flanges radially protruding from the circumference of the cover plate with ribs formed at the circumference of the housing cover by means of screw connections or rivet connections mounted in insertion tabs of the flanges and formed as radial rivets, or the circumference of the cover plate can partly be clipped to hooks protruding from the edge of the housing cover, wherein the hooks are provided directly at a housing cover formed as steel part or at an injection-molded plastic hook.

In a preferred exemplary embodiment, the cross-head slide consists of a plate with a central bore which merges into horizontally oriented guide slots aligned with each other, into which the horizontally oriented guide noses of the wobble gear aligned with each other engage, and consists of guide webs vertically oriented by 90° relative to the horizontal guide slots and protruding from the circumference of the cross-head slide plate, which engage into vertically oriented guide recesses of the guide plate aligned with each other and proceeding from a central bore of the guide plate.

The guide noses of the wobble gear have sliding guide surfaces on the sliding surfaces of the guide slots. Since the guide slots and the guide noses are so long that the guide noses end with a small distance before the root diameter of the external toothing of the wobble gear, the sliding and guide surfaces have a maximum length in radial direction, so that a maximum guide length is realized, which ensures a safe meshing engagement of the external toothing of the wobble gear into the internal toothing of the driven gear in radial direction.

In addition, the sliding surfaces of the guide slots of the cross-head slide and the guide surfaces of the guide noses of the wobble gear have an axial length which is equal to the axial length or thickness of the cross-head slide, whereby in conjunction with the maximum length of the guide slots and guide noses or sliding and guide surfaces a maximum possible bearing surface and hence a minimum surface pressure is ensured between the wobble gear and the cross-head slide. The guide surfaces of the guide noses and the sliding surfaces of the guide slots can extend horizontally in axial direction and hence form a box- or cuboid-shaped profile. Alternatively, the guide surfaces of the guide noses and the sliding surfaces of the guide slots can extend obliquely in axial direction, i.e. form a trapezoidal profile which results in a greater guide surface.

By a connection of the guide noses of the wobble gear via a ring-shaped web extending around the periphery of the bore of the wobble gear a great bearing width, i.e. a great contact surface, is ensured between the wobble gear and the cross-head slide, whereby tilting effects are avoided or at least reduced and a higher stiffness of the guide noses is ensured.

To prevent that the guide surfaces at the cross-head slide protrude into the radius transition of the guide noses of the wobble gear to the end face of the wobble gear, the wobble gear has spacers formed as protrusions on its end face facing the cross-head slide, which define the distance of the end faces of the cross-head slide and wobble gear facing each other.

In an alternative wobble gear transmission as second stage of the two-stage reduction gear, the pre-assembly contains
- a driven wheel with internal toothing concentrically mounted on a shaft, a pinion connected with the driven gear for transmitting the driving torque to a toothing of the adjusting device,
- a wobble gear with a first external toothing which cooperates with the internal toothing of the driven gear, wherein the number of teeth of the first external toothing of the wobble gear and the internal toothing of the driven gear differs by at least one tooth and the tip diameter of the first external toothing of the wobble gear is smaller than the root diameter of the internal toothing of the driven gear by at least one tooth height, and with a second external toothing with a smaller tip diameter as compared to the first external toothing,
- the bell-shaped housing cover with an opening for accommodating a bushing for the axial guidance of the gear elements of the eccentric gear integrated into the pre-assembly and for mounting the pinion,
- a guide plate with an internal toothing into which the second external toothing of the wobble gear engages, wherein the number of teeth of the second external toothing of the wobble gear and the internal toothing of the cover and guide plate differs by at least one tooth and the tip diameter of the second external toothing of the wobble gear is smaller than the root diameter of the internal toothing of the guide plate by at least one tooth height, and
- the cover plate or axially resilient cover plate connected with the edge opposite the opening of the housing cover for axially supporting the gear elements integrated into the pre-assembly.

In this alternative embodiment of the wobble gear transmission, the stationary or firmly mounted ring gear serves as guide plate of the wobble gear transmission, which is arranged in the bell-shaped housing cover and at the opening of the bell-shaped housing cover is covered by a cover plate or alternatively by an axially resilient cover plate, which is connected either with the guide plate of the wobble gear transmission or with the bell-shaped housing cover in the manner described above, for example by interlocking the axially resilient cover plate with the peripheral edge of the bell-shaped housing cover.

In a second exemplary embodiment, the pre-assembly with the alternative wobble gear transmission as second stage of the two-stage reduction gear includes
- a driven gear with internal toothing concentrically mounted on a shaft, a pinion connected with the driven gear for transmitting the driving torque to a toothing of the adjusting device,
- a wobble gear with a first external toothing which cooperates with the internal toothing of the driven gear, wherein the number of teeth of the first external toothing of the wobble gear and the internal toothing of the driven gear differs by at least one tooth and the tip diameter of the first external toothing of the wobble gear is smaller than the root diameter of the internal toothing of the driven gear by at least one tooth height, and with a second external toothing with a smaller tip diameter as compared to the first external toothing,
- the bell-shaped housing cover with an opening for accommodating a bushing for the axial guidance of the gear elements of the eccentric gear integrated into the pre-assembly and for mounting the pinion, and
- the cover and guide plate connected with the edge opposite the opening of the housing cover for axially supporting the gear elements integrated into the pre-assembly, which includes an internal toothing into which the second external toothing of the wobble gear engages, wherein the number of teeth of the second external toothing of the wobble gear and the internal toothing of the cover and guide plate differs by at least one tooth and the tip diameter of the second external toothing of the wobble gear is smaller than the root diameter of the internal toothing of the cover and guide plate by at least one tooth height.

In this embodiment of the wobble gear transmission, the stationary or firmly-mounted ring gear serves both as cover plate for the positive power transmission from the pre-assembly to the housing shell and as guide plate of the wobble transmission.

To ensure that the gear wheels of the driven gear and the wobble gear also remain completely in engagement in the case of a crash, the tip diameter of the first external toothing of the wobble gear and the root diameter of the internal toothing of the cover and guide plate are dimensioned such that the wobble gear supports on the combined cover and guide plate in axial direction, so that in axial direction the wobble gear supports on the combined cover and guide plate with the internal toothing provided in the combined cover and guide plate.

In both embodiments of a wobble gear transmission, the guide plate or the combined cover and guide plate includes peripheral form-fit teeth, which engage in form-fit depressions of the housing shell.

The positive connection between the guide plate and hence the pre-assembly with the housing shell ensures the anti-rotation protection of the pre-assembly and provides for a pre-positioning of the pre-assembly in the housing shell.

Preferably, the form-fit teeth of the guide plate or the combined cover and guide plate protrude from the circumference of the guide plate in pairs at right angles to each other and positively engage into the form-fit depressions at the edge of the second recess of the housing shell, wherein the form-fit teeth are distributed unsymmetrically around the circumference of the guide plate or the combined cover and guide plate. The advantage is that with a sufficient number of form-fit teeth a free space is left at the housing shell for the arrangement of the motor, for example.

The connection of the pre-assembly with the housing shell via a plurality of tooth pairs distributed around the circumference ensures a uniform power transmission from the pre-assembly to the housing shell. Due to the unsymmetric distribution of the toothing around the circumference, constrictions or overlaps in the region of the connection of the drive motor are taken into account, wherein due to the unsymmetric distribution different specifications concerning the installation space are accounted for, since the guide plate or the cover and guide plate can be rotated with the distributed toothing arranged in pairs such that the side or region without toothing is located at the narrowest point each.

For the positive connection of the housing cover with the cover plate or the cover and guide plate, between which the gear elements of the wobble gear transmission are located, the housing cover includes segment arms protruding from its edge connected with the guide plate or the cover and guide plate, which positively engage into segment cutouts of the guide plate or the cover and guide plate.

To ensure an unambiguous abutment of the pre-assembly in the housing shell, the segment arms of the housing cover stand back in axial direction behind the cover plate or the cover and guide plate. It thereby is ensured that the cover plate or the cover and guide plate exclusively rests against the circumferential flange of the housing shell.

For the radially positive connection of the housing cover with the cover plate or the cover and guide plate, which ensures the anti-rotation protection and a part of the power transmission, an additional welded connection of the housing cover with the cover plate or the cover and guide plate is provided in the region of the segment arms of the housing cover. This additional fixation via welding seams prevents an inclined position of the gear wheels and ensures a tooth overlap in the load condition, which also is maintained in the case of a crash, so that constantly high forces can be transmitted.

For pre-fixing the pre-assembly at the housing shell, scraping ribs formed at the form-fit depressions of the periphery of the second recess of the housing shell, which at the edge of the housing shell engage over a part of the peripheral form-fit teeth and which are squeezed during assembly, or interlockings are provided in the housing shell.

Preferably, the pre-assembly is formed as laser-welded assembly.

BRIEF DESCRIPTION OF THE DRAWINGS

The essential features of the invention and their variation possibilities will now be explained with reference to exemplary embodiments illustrated in the drawing:

FIGS. 13-15 show schematic-perspective representations of alternative types of connection between the housing cover and the cover plate.

FIG. 18 shows a front-side view of the pre-assembly according to FIG. 17 with axially resilient cover plate interlocked with the housing cover.

FIG. 19 shows a longitudinal section through the pre-assembly along the sectional line XIX of FIG. 18.

FIG. 23 shows a perspective representation of the assembled pre-assembly according to FIG. 22.

FIG. 24 shows a perspective longitudinal section through the assembled pre-assembly according to FIG. 23.

DETAILED DESCRIPTION

Figure 1:
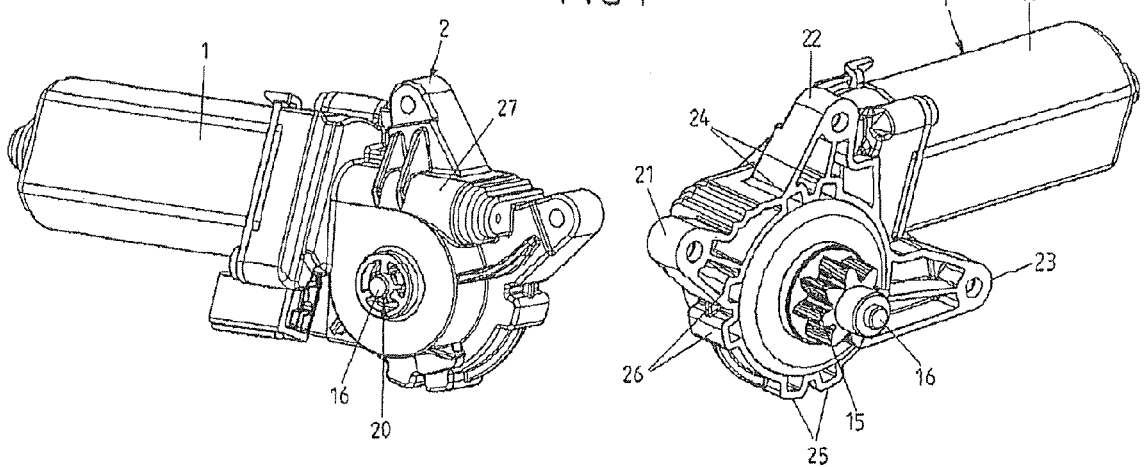
FIG. 1 shows a perspective representation of an electromotive adjustment drive from two viewing directions.
Figure 2:
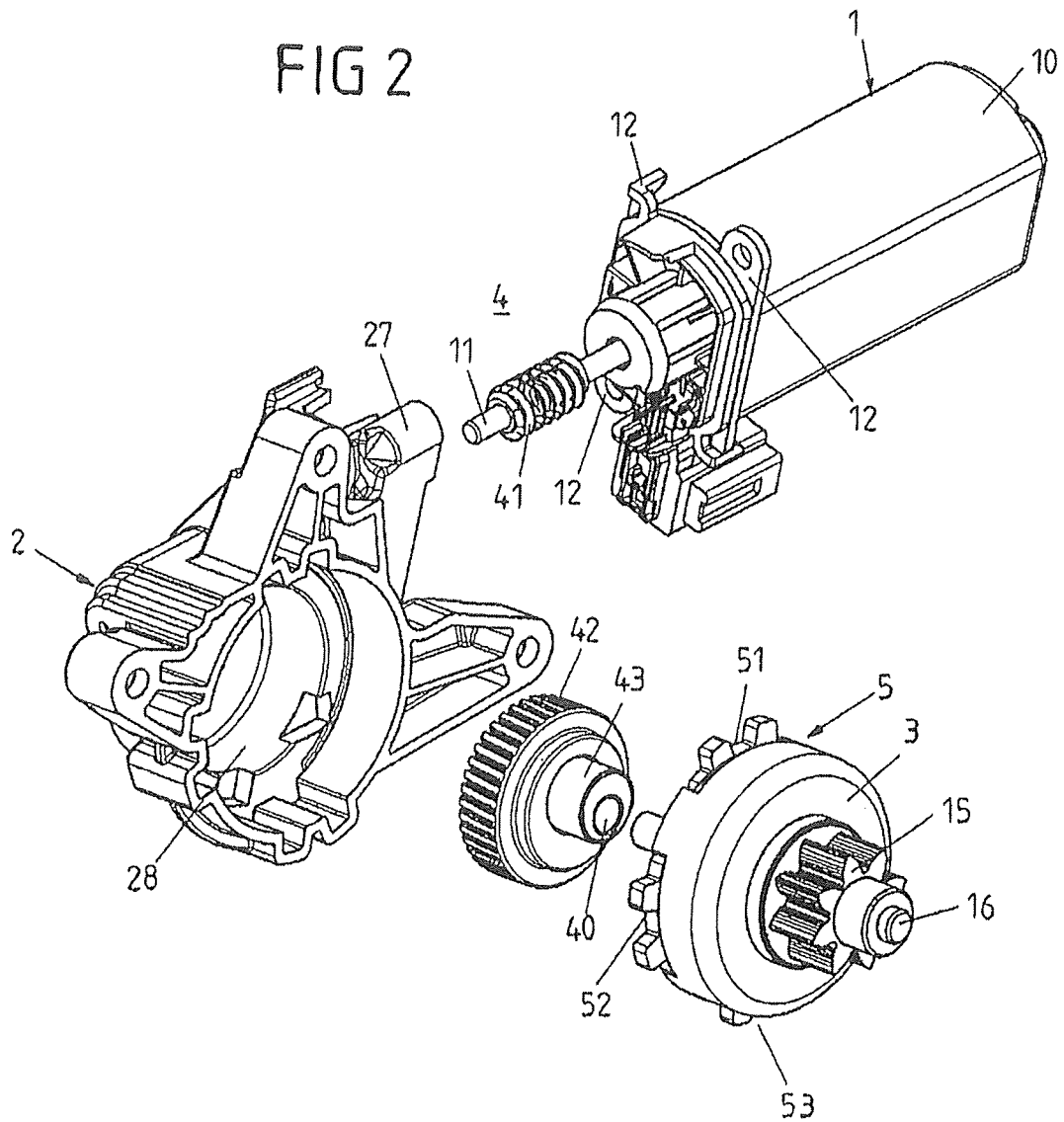
FIG. 2 shows a perspective exploded representation of the assemblies of the adjustment drive according to the invention.
Figure 3:
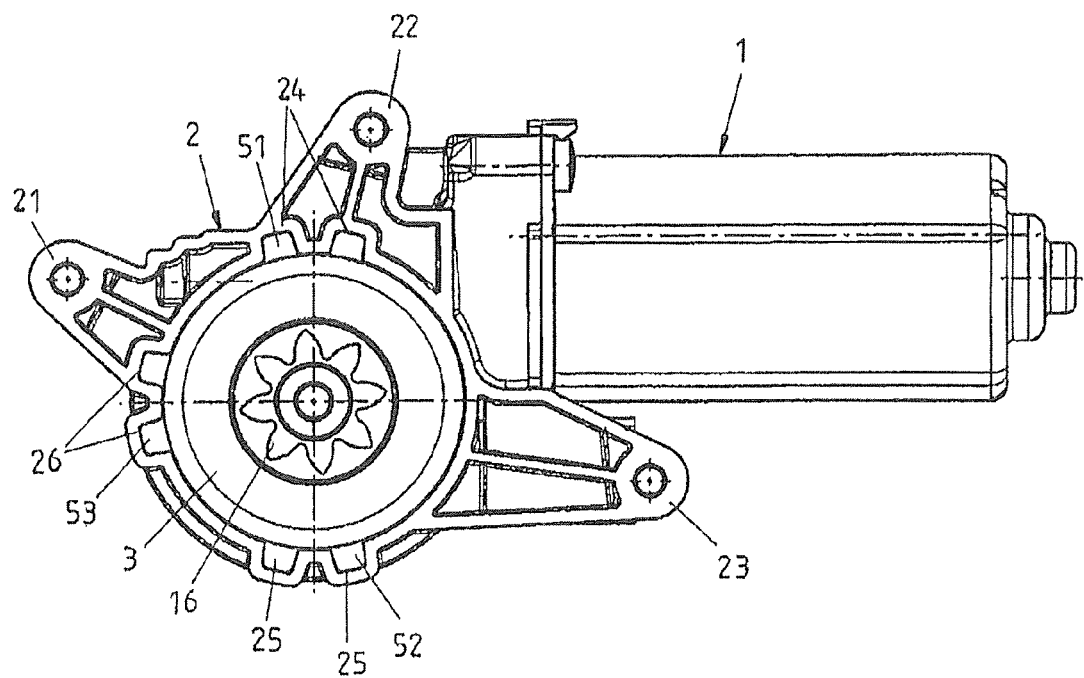
FIG. 3 shows a side view of the adjustment drive according to FIGS. 1 and 2.

The adjustment drive according to the invention is shown in FIG. 1 in a perspective representation from different viewing directions, in FIG. 2 in an exploded representation of the assemblies, and in FIG. 3 in a side view. The adjustment drive comprises a drive motor 1 with a motor housing 10 and a motor shaft 11, on which a drive worm 41 of a self-locking worm gear transmission 4 is non-rotatably fixed. A housing shell 2 of a drive housing includes a hollow cylindrical first recess 27 for accommodating the drive worm 41 of the worm gear transmission 4 and for supporting the motor shaft 11 of the drive motor 1 as well as a pot-shaped second recess 28 for accommodating a pre-assembly 5 and an assembly which consists of a helical gear 42 of the worm gear transmission 4 and an eccentric 43 integrally connected with the helical gear 42, which serves as coupling member between the first reduction gear stage consisting of the worm gear transmission 4 and a second reduction gear stage contained in the pre-assembly 5, which will be explained below with reference to two different exemplary embodiments. A bore 20 arranged in the center of the pot-shaped second recess 28 serves for accommodating a shaft 16 of the pre-assembly 5, which is put through a bore 40 of the component consisting of the helical gear 42 and the eccentric 43.

The housing shell 2 includes a plurality of flange arms 21, 22, 23 radially protruding from the pot-shaped second recess 28 with end-side mounting openings, which serve for accommodating fastening means for connecting the housing shell 2 and hence the adjustment drive with the supporting structure of an adjusting device of a motor vehicle seat, which is adjusted by means of the adjustment drive. At the edge of the pot-shaped second recess 28 three form-fit depressions 24 to 26 arranged in pairs are distributed, which serve the anti-rotation protection of the pre-assembly 5 inserted into the pot-shaped second recess 28 with the component consisting of the helical gear 42 and the eccentric 43 put onto the shaft 16 of the pre-assembly 5.

The connection of the drive motor 1 with the housing shell 2 is effected via a plurality of flanges 12 with corresponding receptacles of the housing shell 2, which are distributed over the end face of the motor housing 10.

According to FIGS. 2 and 3, the pre-assembly 5 forms a closed construction unit which contains a pot-shaped housing cover 3, into whose opening facing away from the housing shell 2 a bushing 30 is inserted. The pot-shaped housing cover 3 closes the pot-shaped second recess 28 of the housing shell 2 in the completely mounted condition as shown in FIGS. 1 and 3. For the anti-rotation protection of the pre-assembly 5 and for the power transmission from the pre-assembly 5 to the housing shell 2, form-fit teeth 51, 52, 53 distributed in pairs around the circumference of the pre-assembly 5 are provided, which can be inserted into the peripheral form-fit depressions 24, 25, 26 likewise arranged in pairs at the edge of the pot-shaped second recess 28 of the housing shell 2. As shown in the side view of FIG. 3, the form-fit teeth 51, 52, 53 and form-fit depressions 24, 25, 26 for the positive connection between the housing shell 2 and the pre-assembly 5 are arranged unsymmetrically with respect to the shaft 16 of the pre-assembly 5, in order to take account of constrictions in the connection between the housing shell 2 and the drive motor 1, which will be explained below in conjunction with the schematic representation of FIG. 10.

Figure 4:
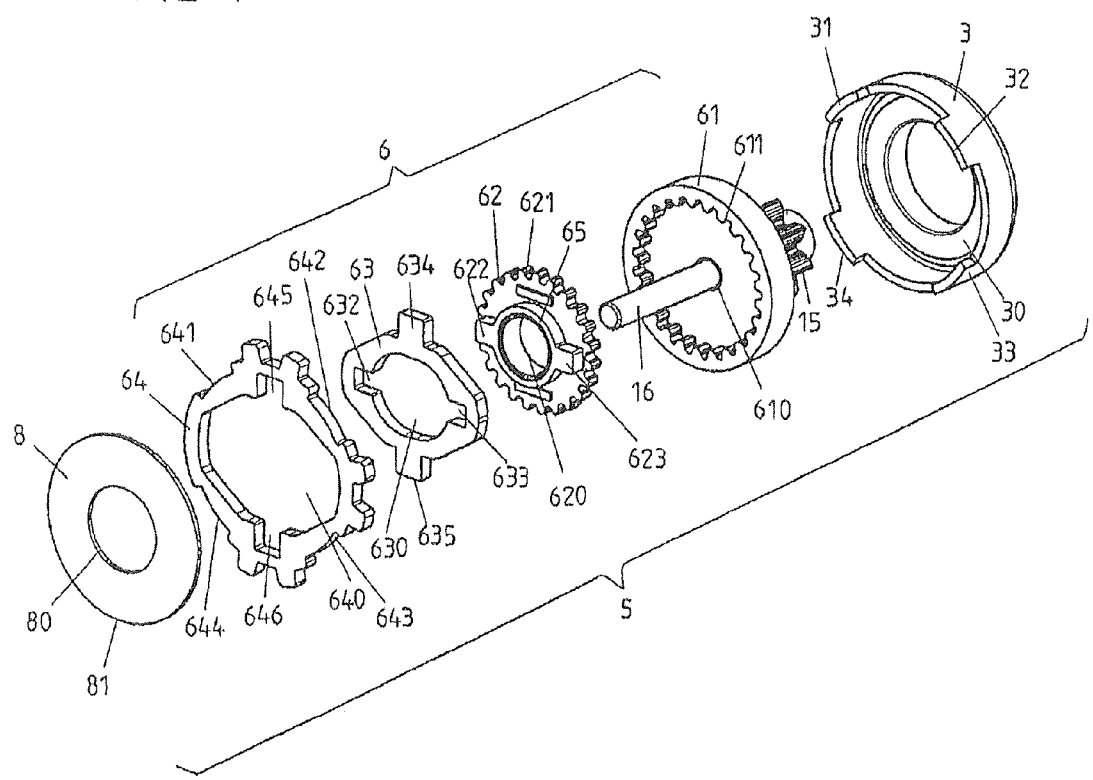
FIG. 4 shows an exploded representation of the pre-assembly and a wobble gear transmission with a guide means formed as cross-head slide.
Figure 5:
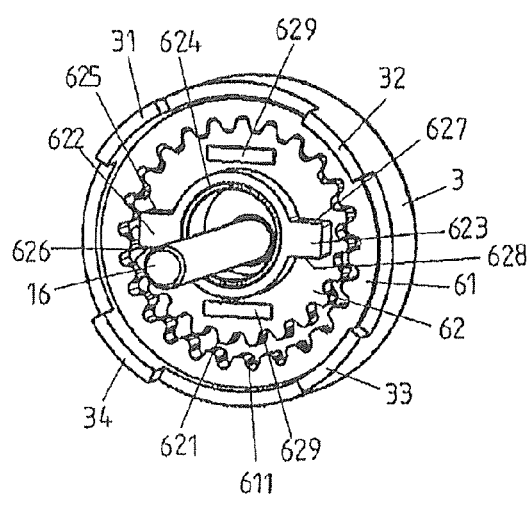
FIG. 5 shows a perspective representation of the driven gear and wobble gear of the wobble gear transmission inserted into the housing cover according to FIG. 4.
Figure 6:
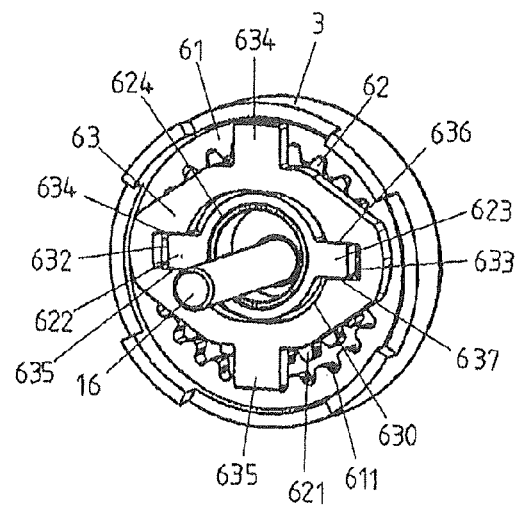
FIG. 6 shows a perspective representation of the driven gear, wobble gear, and cross-head slide of the wobble gear transmission inserted into the housing cover according to FIG. 4.

FIG. 4 shows an exploded view both of the components of the pre-assembly 5 and of the gear elements integrated into the pre-assembly 5 of a first embodiment of the wobble gear transmission 6, and FIGS. 5 and 6 show the connection of the gear elements of the wobble gear transmission 6, which are inserted into the housing cover 3 and put onto the shaft 16.

The wobble gear transmission 6 forming the second reduction gear stage of the reduction transmission consists of a driven gear 61 with an internal toothing 611, which is connected with an output pinion 15 which is connected with a corresponding gear element of the adjusting device, which for example consists of a seat height adjuster, seat depth adjuster, lordosis adjuster, backrest inclination adjuster or longitudinal seat adjuster. The external toothing 621 of a wobble gear 62 meshes with the internal toothing 611 of the driven gear 61, with the number of teeth of the external toothing 621 of the wobble gear 62 differing from that of the internal toothing 611 of the driven gear 61 by at least one tooth. Into a central bore 620 of the wobble gear 62 a bushing 65 is inserted, which is put onto the outer circumference of the eccentric 43 according to FIG. 2, which serves as coupling member between the first reduction gear stage formed of the worm gear transmission 4 and the second reduction gear stage of the reduction transmission formed of the wobble gear transmission 6.

A guide means formed of a plate-shaped cross-head slide 63 and a ring-shaped guide plate 64 serves for guiding the wobble gear 62 in a plane without intrinsic rotation of the wobble gear 62, which thus performs a wobbling movement on a circular path. As a result of the eccentric movement of the eccentric 43 about the shaft 16 and the number of teeth of the external toothing 621 of the wobble gear 62 smaller by at least one tooth as compared to the internal toothing 611 of the driven gear 61, the wobble gear 62 performs an oscillating, but non-rotational movement about the shaft 16, wherein because of the high reduction effect the number of revolutions of the driven gear 62 is distinctly smaller than the number of revolutions of the wobble gear 62.

For guidance of the wobble gear 62, the wobble gear 62 includes guide noses 622, 623 arranged diametrically to each other and aligned with each other, which engage in guide slots 632, 633 of the cross-head slide 63, which proceed from a central opening 630 of the cross-head slide 63 likewise diametrically and in alignment with each other. The guide noses 622, 623 of the wobble gear 62 and the guide slots 632, 633 of the cross-head slide 63 form a sliding connection in which the guide surfaces 625-628 (FIG. 5) of the guide noses 622, 623 slide over the sliding surfaces 634-637 (FIG. 6) of the guide slots 632, 633 of the cross-head slide 63 during the wobbling movement of the wobble gear 62.

The guide slots 632, 633 and the guide noses 622, 623 have such a length that the guide noses 622, 623 according to FIGS. 4 and 5 end shortly before the root diameter of the external toothing 621 of the wobble gear 62, so that the sliding and guide surfaces 634-637 and 625-628 realize a maximum guide length in radial direction, which ensures a safe meshing engagement of the external toothing 621 of the wobble gear 62 into the internal toothing 611 of the driven gear 61 in radial direction.

The sliding surfaces 634-637 of the guide slots 632, 633 of the cross-head slide 63 and the guide surfaces 625-628 of the guide noses 622, 623 of the wobble gear 62 in addition have an axial length which according to FIG. 6 is equal to the axial length or thickness of the cross-head slide 62, whereby in conjunction with the maximum length of the guide slots 632, 633 and guide noses 622, 623 and hence of the sliding and guide surfaces 634-637 and 625-628 a largest possible bearing surface and a minimum surface pressure between the wobble gear 62 and the cross-head slide 63 is ensured.

The guide surfaces 625-628 of the guide noses 622, 623 and the sliding surfaces 634-637 of the guide slots 632, 633 can extend horizontally in axial direction and hence form a box- or cuboid-shaped profile as shown in FIGS. 5 and 6. Alternatively, the guide surfaces 625-628 of the guide noses 622, 623 and the sliding surfaces 634-637 of the guide slots 632, 633 can extend obliquely in axial direction, i.e. form a trapezoidal profile which results in a greater guide surface.

Vertically to the orientation of the guide slots. 632, 633 of the cross-head slide 63 guide pins 634, 635 are arranged, which protrude from the circumference of the cross-head slide 63. The guide pins 634, 635 engage in guide slots 645, 646 of the guide plate 64 of the guide means, which likewise proceed from a central opening 640 arranged diametrically to each other. At the circumference of the guide plate 64 the form-fit teeth 51, 52, 53 are arranged in pairs in an unsymmetric arrangement for the anti-rotation protection of the pre-assembly 5, which—as described above—engage in the form-fit depressions 24, 25, 26 of the housing shell 2.

The pre-assembly 5 is terminated by a circular ring-shaped cover plate 8 with a circular opening 80, which for supporting the pre-assembly 5 in axial direction is connected with the housing cover 3 with its peripheral edge 81, so that the engagement of the external toothing 621 of the wobble gear 62 into the internal toothing 611 of the driven gear 61 also is secured in the case of impact loads and in particular in the case of a crash. The connection of the housing cover 3 with the cover plate 8 for axially supporting the pre-assembly 5 will be explained in detail below.

FIG. 5 shows the driven gear 61 put onto the shaft 16 with its opening 610, into whose internal toothing 611 the external toothing 621 of the wobble gear 62 partly engages. According to FIG. 6, the cross-head slide 63 is put onto the wobble gear 62, so that the horizontal guide noses 622, 623 of the wobble gear 62 ending shortly before the external toothing 621 of the wobble gear 62 engage into the guide slots 632, 633 of the cross-head slide 63 with maximum length and ensure a safe meshing engagement of the external toothing 621 of the wobble gear 62 into the internal toothing 611 of the driven gear 61 in radial direction.

Furthermore, the horizontal sliding surfaces 634-637 of the guide slots 632, 633 of the cross-head slide 63 and the guide surfaces 625-628 of the guide noses 622, 623 of the wobble gear 62 have an axial length which is equal to the axial length or thickness of the cross-head slide 63, whereby in conjunction with the maximum length of the guide slots 632, 633 and guide noses 622, 623 or sliding and guide surfaces 634-637, 625-628 a largest possible bearing surface and hence a minimum surface pressure between the wobble gear 62 and the cross-head slide 63 is ensured.

FIG. 5 also shows the formation of a circumferential, ring-shaped web 624 on the periphery of the bore 620 of the wobble gear 62, which connects the guide noses 622, 623 and has the same axial length as the guide noses 622, 623. The circumferential web 624 ensures a great bearing width, i.e. a great contact surface, between the wobble gear 62 and the cross-head slide 63, whereby tilting effects are avoided or at least reduced and a higher stiffness of the guide noses 622, 623 is ensured.

Furthermore, FIG. 5 shows spacers 625, 626 arranged diametrically to each other and offset by 90° to the guide noses 622, 623, which are formed as horizontal webs whose significance will be explained in detail below with reference to FIGS. 7 and 8.

Figure 7:
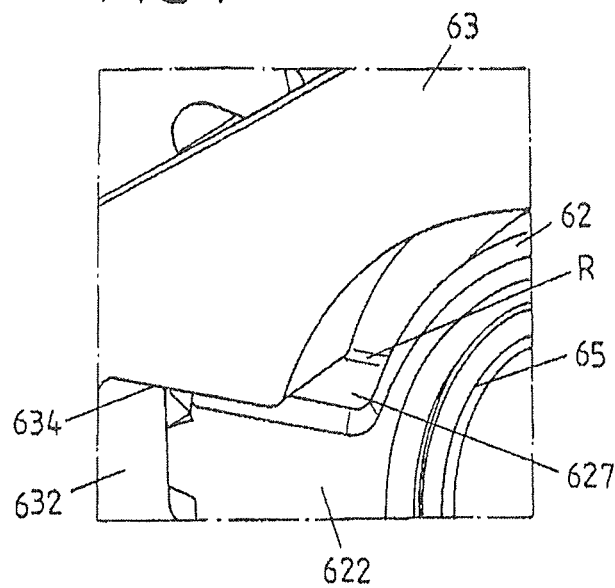
FIG. 7 shows a perspective detail view of the wobble gear and cross-head slide in the region of a guiding protrusion of the wobble gear.
Figure 8:
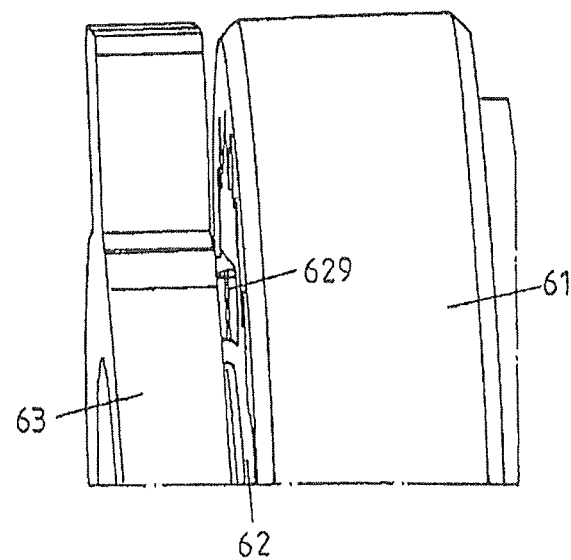
FIG. 8 shows a side view of the driven gear, wobble gear and cross-head slide according to FIGS. 4 and 6.

FIG. 7 shows a detail view of the cooperation of the guide slots 632, 633 of the cross-head slide 63 and the guide noses 622, 623 of the wobble gear 62, whose sliding and guide surfaces 634-637, 625-628 slide in each other during the wobbling movement of the wobble gear 62. To prevent that the sliding surfaces 634-637 of the guide slots 632, 633 of the cross-head slide 63 protrude into the radius transition R from the end face of the wobble gear 62 to the guide surfaces 625-628, spacers 629 are arranged diametrically to each other on the end face of the wobble gear 62 according to FIGS. 5 and 8, which spacers ensure a minimum distance between the cross-head slide 63 and the end face of the wobble gear 62 facing the cross-head slide 63 and thus ensure a defined support of the sliding surfaces 634-637 on the guide surfaces 625-628, so that tilting of the cross-head slide 63 is avoided.

After assembly of the cross-head slide 63 according to FIG. 6, the guide plate 64 is put onto the cross-head slide 63 such that the guide slots 645, 646 of the guide plate 64 engage into the guide pins 634, 635 of the cross-head slide 63.

The cross-shaped guiding means of the wobble gear transmission 6 formed of the cross-head slide 63 and the guide plate 64 with the guide noses 622, 623, guide slots 632, 633, 645, 646 and guide pins 634, 635 arranged diametrically to each other effects that the guide noses 622, 623 of the wobble gear 6 immerse into the guide slots 632, 633 of the cross-head slide 63, whereas the guide webs 634, 635 of the cross-head slide 63 immerse into the guide slots 645, 646 of the guide plate 64. The guide slots 632, 633, 645, 646 of the cross-head slide 63 and the guide plate 64 arranged at right angles to each other effect that when the wobble gear 62 is driven by the eccentric 43, a movement of the wobble gear 62 is effected such that during a revolution of the helical gear 42 the wobble gear 62 performs a circular movement without intrinsic rotation, in which the wobble gear 62 is guided horizontally by the guide noses 622, 623 in the guide slots 632, 633 and vertically by the guide pins 634, 635 in the guide slots 645, 646 of the guide plate. In dependence on the different number of teeth of the external toothing 621 of the wobble gear 62 and the internal toothing 611 of the driven gear 61, the driven gear 61 is rotated in peripheral direction by one or more tooth pitches with each revolution of the helical gear 42.

When putting the guide plate 64 onto the cross-head slide 63, segment arms 31 to 34 regularly distributed around the circumference of the edge of the housing cover 3 and arranged diametrically to each other in pairs engage into corresponding segment cutouts 641 to 644 formed on the circumference of the guide plate 64 and shown in FIG. 4 and hence secure the position of the guide plate 64 in radial direction. The form-fit teeth 51, 52, 53 arranged in pairs and distributed unsymmetrically around the circumference of the guide plate 64 protrude beyond the edge of the housing cover 3 in radial direction.

Subsequently, the cover plate 8 is put into the opening formed by the segment arms 31 to 34 of the housing cover 3 and with its peripheral edge 81 comes to abut against the insides of the segment arms 31 to 34 of the housing cover 3 and with its end face facing the gear elements of the wobble gear transmission 6 comes to abut against the guide plate 64, wherein the shaft 16 protrudes through the circular opening 80 of the cover plate 8.

Figure 9:
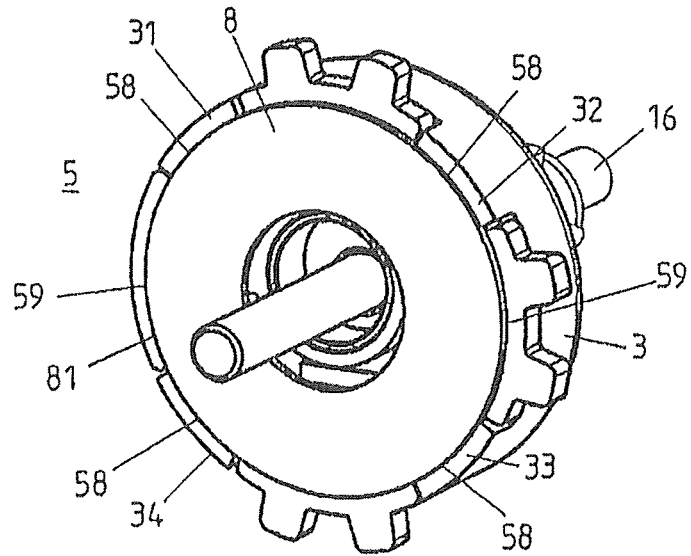
FIG. 9 shows a perspective overall view of the pre-assembly according to FIG. 4 in the assembled condition with housing cover and cover plate with schematically indicated welding seams between the housing cover and the cover plate or between the cover plate and the guide plate.

FIG. 9 shows the pre-assembly 5 in the assembled condition with the central shaft 16, which is put through the bore 610 of the driven gear 61, the bushing 65 in the central bore 620 of the wobble gear 62, the opening 630 of the cross-head slide 63, the opening 640 of the guide plate 64 and the circular opening of the cover plate 8.

After assembly of the pre-assembly 5, fixing of the pre-assembly 5 is effected by means of first welding seams 58 applied between the segment arms 31 to 34 of the housing cover 3 and the peripheral edge 81 of the cover plate 8, which preferably are made by means of laser welding and prevent an inclined position of the driven gear 61 and wobble gear 62, so that the tooth overlap of the external toothing 621 of the wobble gear 62 and the internal toothing 611 of the driven gear 61 is maintained in a load condition for the transmission of high forces and in particular in the case of a crash.

Two welding seams 59 connect the peripheral edge 81 of the cover plate 8 with the peripheral edge of the guide plate 64 and prevent the occurrence of rattling noise.

Alternatives to the application of the first welding seams 58 between the segment arms 31 to 34 of the housing cover 3 and the peripheral edge 81 of the cover plate 8 will be described below with reference to FIGS. 13 to 15.

After the assembly and axial fixation of the gear elements of the pre-assembly 5 by connecting the segment arms 31 to 34 of the housing cover 3 with the edge of the cover plate 8, the helical gear 42 of the first reduction gear stage 4 connected with the eccentric 43 is put onto the shaft 16 with the bore 40, so that the eccentric 43 engages into the bushing 65 of the wobble gear 62. The pre-assembly 5 connected with the helical gear 42 and the eccentric 43 subsequently is inserted into the second recess 28 of the housing shell 2, wherein the form-fit teeth 51, 52, 53 arranged in pairs and arranged unsymmetrically on the circumference of the guide plate 64 engage into the form-fit depressions 24 to 26 at the edge of the second recess 28 of the housing shell 2 and create a positive connection between the pre-assembly 5 and the housing shell 2. The shaft 16 of the pre-assembly 5 engages into the opening 20 of the housing shell 2 and thus is mounted in the same and in the opening 610 of the driven gear 61.

Figure 10:
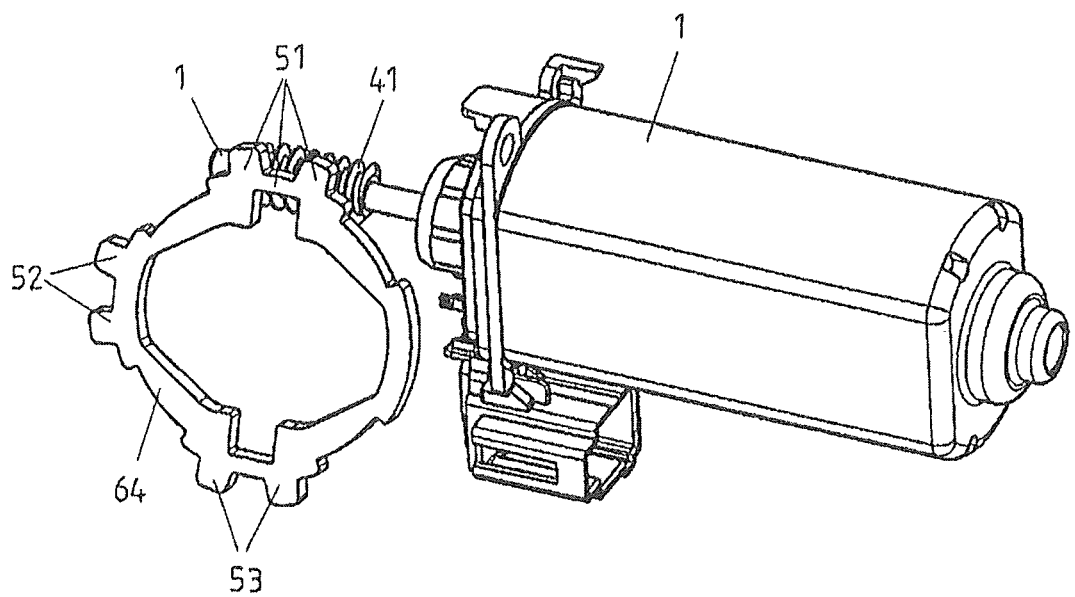
FIG. 10 shows a perspective partial view of the drive motor and the guide plate of the wobble gear transmission according to FIGS. 4 to 9.

FIG. 10 shows a schematic representation of the unsymmetric arrangement of the form-fit teeth 51, 52, 53 arranged in pairs on the circumference of the guide plate 64, which with the pre-assembly 5 inserted into the second recess 28 of the housing shell 2 engage into the form-fit depressions 24, 25, 26 arranged in pairs on the circumference of the second recess 28 of the housing shell 2 for an anti-rotation protection of the pre-assembly 5. Since in the region of the end face of the drive motor 1 a constriction or overlap with the form-fit teeth 51, 52, 53 and the form-fit depressions 24, 25, 26 would occur, the guide plate 64 is rotated during assembly of the pre-assembly 5 such that the region of the guide plate 64 without form-fit teeth 51, 52, 53 is located at the narrowest point. Hence, in applications with other specifications as to the installation space the guide plate 64 always can be mounted in the pre-assembly 5 with such a rotation that no overlaps are obtained.

Subsequently, the mode of operation of the reduction gear transmission formed of the first and second reduction gear stage known per se will briefly be described.

The drive worm 41 of the self-locking worm gear transmission 4 connected with the motor shaft 11 engages into the external toothing of the helical gear 42 with its worm toothing, so that by actuating the drive motor 1 and rotating the drive worm 41 the helical gear 42 is put into rotation about the shaft 16 put into the opening 40. The eccentric 43 engaging into the bushing 65 of the wobble gear 62 and connected with the helical gear 42 moves the wobble gear 62 on a circular path, wherein the guide means consisting of the cross-head slide 63 and the guide plate 64 prevents an intrinsic rotation of the wobble gear 62.

With its external toothing 621 the wobble gear 62 cooperates with the internal toothing 611 of the driven gear 61, wherein the rolling movement of the driven gear 61 on the external toothing 621 of the wobble gear 62 with respect to the non-rotatably held wobble gear 62 effects a reduction of the number of revolutions of the driven gear 61 with respect to the number of revolutions of the eccentric 43 or the number of revolutions of the wobble gear 62 corresponding to the number of revolutions of the eccentric 43. With the two-stage self-locking reduction gear, which consists of the first reduction gear stage formed as worm gear transmission 4 and the second reduction gear stage formed as wobble gear transmission 6, the high speed of the drive motor 1 is converted into a reduced, slow rotary movement of the driven gear 61 and hence of the pinion 15 connected with the driven gear 61, which in engages into an output element of an adjusting device of the motor vehicle seat, for example into a tooth segment, a gear wheel or a toothed rack.

The form-fit teeth 51, 52, 53 arranged in pairs and distributed unsymmetrically around the circumference of the guide plate 64 in conjunction with the form-fit depressions 24, 25, 26 at the edge of the second recess 28 of the housing shell 2 provide for a positive anti-rotation protection of the pre-assembly 5 of the housing shell 2.

Figure 11:
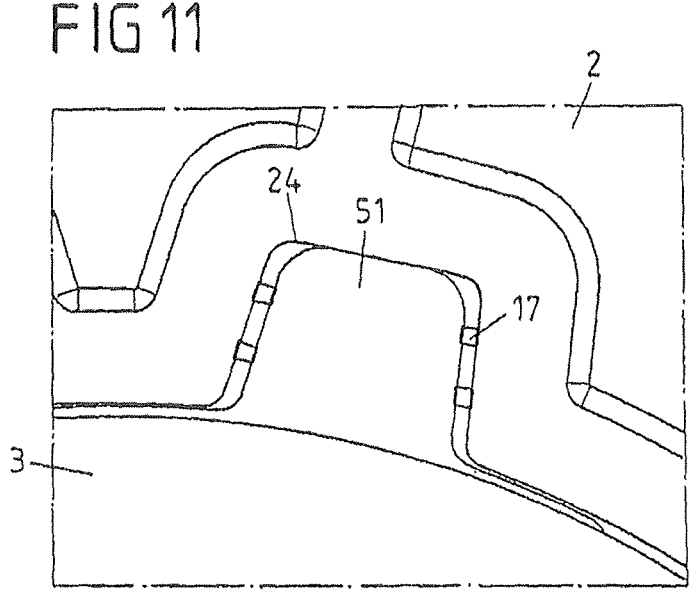
FIG. 11 shows a detail view of a peripheral form-fit tooth of the guide plate inserted into a peripheral recess of the housing shell with scraping ribs arranged at the peripheral form-fit depression of the housing shell.
Figure 12:
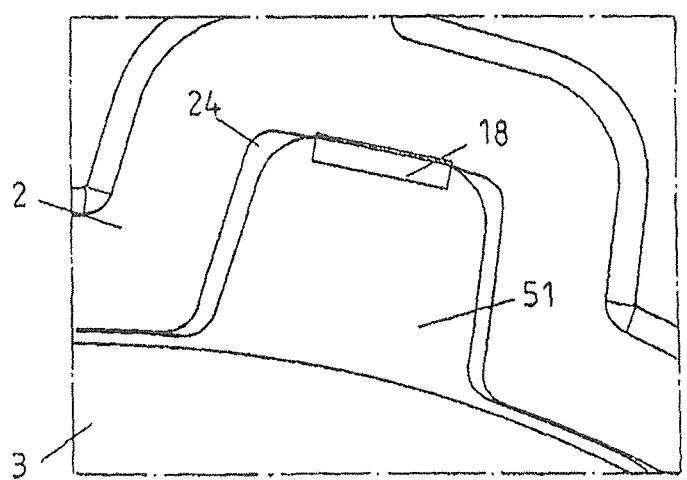
FIG. 12 shows a detail view of a peripheral form-fit tooth of the guide plate inserted into a peripheral recess of the housing shell with interlocking arranged at the peripheral form-fit depression of the housing shell.

According to FIGS. 11 and 12, scraping ribs 17 squeezed during assembly at the form-fit depressions 24, 25, 26 or interlockings 18 arranged at the edge of the form-fit depressions 24, 25, 26 can be provided for an axial pre-fixation and/or for safe transport, so that the pre-assembly 5 can be connected with the housing shell 2 and hence be secured as part of the adjustment drive up to the final assembly of the adjustment drive. For the final assembly, fastening screws are put through the bores of the flange arms 21, 22, 23 radially protruding from the housing shell 2 and connected with the stationary part of an adjusting device, wherein the pinion 16 engages into the corresponding output element of the adjusting device.

As alternatives to the first welding seams 58 as shown in FIG. 9 for fixing the pre-assembly 5, FIGS. 13 to 15 show various types of connection for the firm connection of the housing cover 3 with the cover plate 8.

In the perspective partial view shown in FIG. 13, flanges 82 radially protruding from the circumference of the cover plate 8 include insertion tabs 83 which are connected with the ends of the segment arms 31-34 of the housing cover 3, i.e. connected with the segment arms 31 to 34 of the housing cover 3 via radial rivets.

Instead of a rivet connection a screw connection can be provided according to FIG. 14, in which a screw 14 is inserted through an opening 84 in the flanges 82 radially protruding from the peripheral edge 81 of the cover plate 8 and is screwed to a thread arranged in the end face of the segment arms 31 to 34 of the housing cover 3.

In a perspective detail view of FIG. 15, a clip connection is provided between the housing cover 3 and the cover plate 8, in which hooks 13 arranged at the end face of the segment arms 31 to 34 of the housing cover 3 are clipped to the peripheral edge 81 of the cover plate 8. The hooks 13 can be formed as steel parts of the segment arms 31 to 34 of the housing cover 3 or as injection-molded plastic hooks.

As an alternative, FIGS. 16 to 21 show a connection between a housing cover 3 and an axially resilient cover plate 8'.

Figure 16:
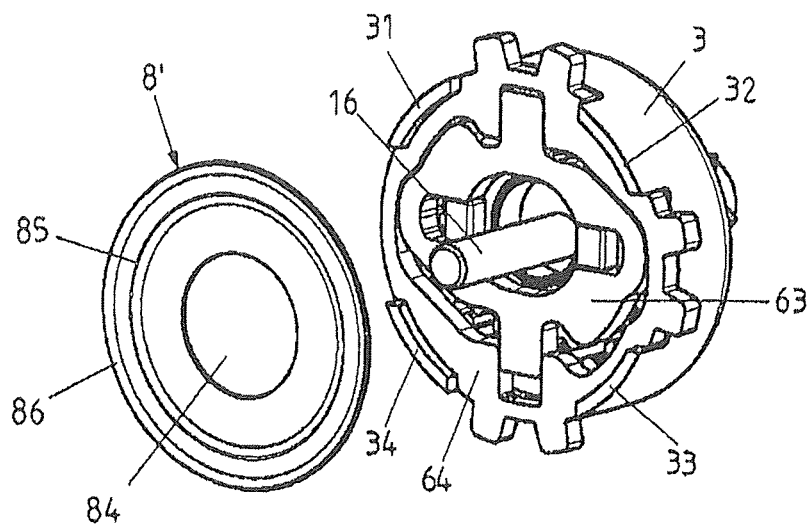
FIG. 16 shows a perspective view of the pre-assembly according to FIG. 4 with a pot- or bell-shaped housing cover and an axially resilient cover plate to be interlocked with the housing cover.

FIG. 16 shows a perspective view of the pre-assembly of FIG. 9 without cover plate 8, but with a separately illustrated axially resilient cover plate 8', which is inserted into the housing cover 3 instead of the cover plate 8 and is interlocked with the segment arms 31 to 34 of the housing cover 3. For this purpose, the axially resilient cover plate 8' has a spring profile 85 between the bore 80 and an interlocking edge 86, which after interlocking the interlocking edge 86 with the segment arms 31 to 34 of the housing cover 3 exerts an axial compressive force onto the gear elements of the second reduction gear stage of the pre-assembly. An existing axial clearance between the gear elements of the pre-assembly thereby is removed and an optimum engagement of the gear elements is ensured with a minimum generation of noise. Even under the influence of high forces, for example in the case of a crash, it hence is prevented that the gear elements of the second reduction stage get out of engagement.

Figure 17:
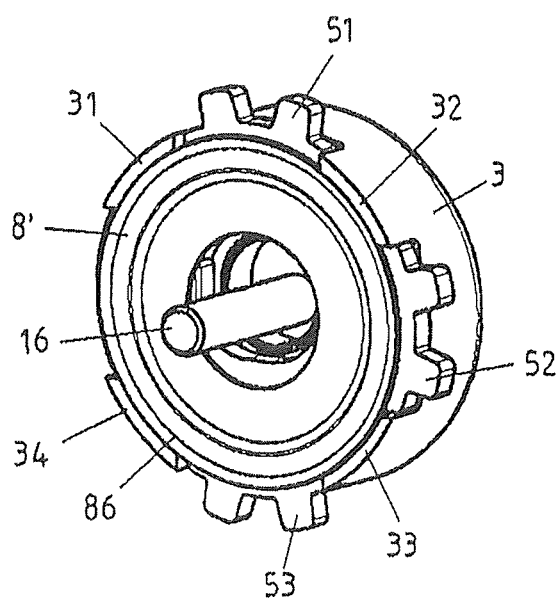
FIG. 17 shows a perspective overall view of the pre-assembly according to FIG. 16 with axially resilient cover plate interlocked with the housing cover.

A further advantage of the axially resilient cover plate 8' consists in that proceeding from the perspective representation according to FIG. 16 the axially resilient cover plate 8' merely must be pressed into the outer contour of the housing cover, for example into the segment arms 31 to 34, in order to complete the pre-assembly according to FIG. 17. This ensures a very easy assembly with an axial support of the gear elements of the second reduction stage at the same time.

FIG. 18 shows a front-side view and FIG. 19 shows a longitudinal section of the completed pre-assembly of FIG. 17 with axially resilient cover plate 8' pressed into the outer contour of the housing cover 3, whose interlocking edge 86 is interlocked with the inner edge of the segment arms 31 to 34 and which rests against the gear elements of the second reduction stage in an axially resilient manner.

Figure 20:
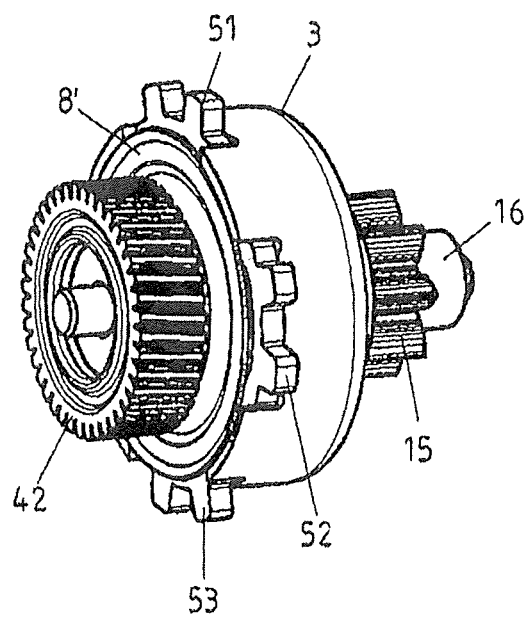
FIG. 20 shows a perspective view of the pre-assembly according to FIG. 17 with mounted gear wheel of the first reduction gear stage.

After assembly of the pre-assembly according to FIG. 20, the gear wheel of the first reduction gear stage is put onto the shaft 16 of the pre-assembly 5 analogous to the representation and description of FIG. 2 and the pre-assembly 5 is connected with the housing shell 2.

Figure 21:
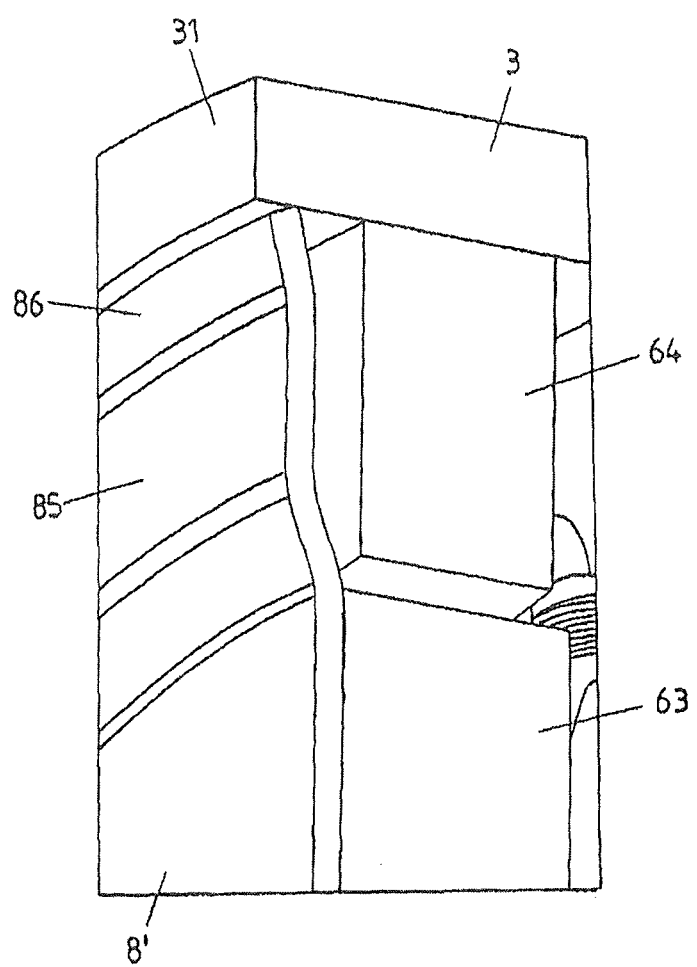
FIG. 21 shows an enlarged perspective detail view of the interlocking of the axially resilient cover plate with the housing cover of the pre-assembly.

FIG. 21 shows an enlarged perspective detail view of the interlocking of the interlocking edge 86 of the axially resilient cover plate 8' with the inner edge of one of the segment arms 31 to 34. Depending on the necessary pressing force, the degree of interlocking or the interlocking geometry can be effected with different angles of attack or degrees of overlap with respect to the inner edge of the segment arms 31 to 34.

Due to this form of connection of the axially resilient cover plate 8' with the housing cover 3, connecting elements such as screws or rivets or special connecting operations such as welding, bonding or the like can be omitted.

FIGS. 22 to 25 show an alternative wobble gear transmission as second reduction gear stage, which likewise is integrated into the pre-assembly 5.

Figure 22:
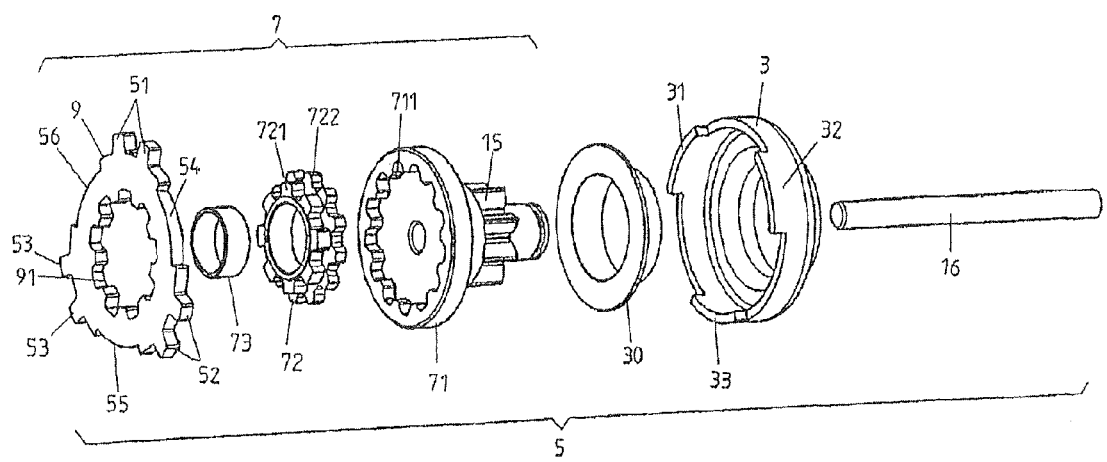
FIG. 22 shows a perspective exploded representation of a pre-assembly with an alternative wobble gear transmission with a guide means formed as toothing of a firmly mounted ring gear and a combined cover and guide plate.

The alternative wobble gear transmission 7 shown in FIG. 22 in a perspective exploded representation, in FIG. 23 in the assembled condition, and in FIG. 18 in a perspective longitudinal section as part of a pre-assembly 5 includes a wobble gear 72 provided with two external toothings 721, 722 with different diameters, into whose bore a bushing 73 is inserted, into which the eccentric 43 of FIG. 2 engages.

The first external toothing 721 of the wobble gear 72 has a smaller tip diameter than the second external toothing 722 and meshes with the internal toothing 91 of a combined cover and guide plate 9, which includes form-fit teeth 51, 52, 53 distributed in pairs around the circumference corresponding to the guide plate 64, which engage into the form-fit depressions 24, 25, 26 at the edge of the second recess 28 of the housing shell 2, and three segment recesses 54, 55, 56, into which in this exemplary embodiment three segment arms 31 to 33 of the housing cover 3 engage, into which a bushing 30 is inserted. The combined cover and guide plate 9 thus serves both as cover plate of the pre-assembly 5, which in conjunction with the housing cover axially secures the gear elements of the wobble gear transmission 7 and positively connects the pre-assembly 5 with the housing shell 2, and for guiding the wobble gear 72, so that the same performs a wobbling movement without intrinsic rotation.

With its first external toothing 721, the wobble gear 72 meshes with the internal toothing 91 of the combined cover and guide plate 9, wherein the number of teeth of the first external toothing 721 of the wobble gear 72 differs from the internal toothing 91 of the combined cover and guide plate 9 by at least one tooth and the outside diameter of the wobble gear 72, i.e. the tip diameter of the first external toothing 721, is smaller than the inside diameter of the combined cover and guide plate 9, i.e. the root diameter of the internal toothing 91 of the combined cover and guide plate 9, by at least one tooth height.

The second external toothing 722 of the wobble gear 72 axially offset to the first external toothing 721 meshes with the internal toothing 711 of a driven gear 71, which is connected with a pinion 15 which in a way analogous to the exemplary embodiment described above is in engagement with a corresponding output element of the adjusting device, for example a seat height adjuster, a seat depth adjuster, lordosis adjuster, backrest inclination adjuster or longitudinal seat adjuster.

The number of teeth of the second external toothing 722 of the wobble gear 72 and the internal toothing 711 of the driven gear 71 likewise differs by at least one tooth, i.e. the tip diameter of the second external toothing 722 of the wobble gear 72 is smaller than the root diameter of the internal toothing 711 of the driven gear 71 by at least one tooth height.

The ratio of the tooth numbers of the internal toothing 91 of the combined cover and guide plate 9 to the first external toothing 721 of the wobble gear 72 differs from the ratio of the tooth numbers of the internal toothing 711 of the driven gear 71 to the second external toothing 722 of the wobble gear 72, which results in a reduction of the rotation transmitted from the helical gear 42 of the worm gear transmission 4 via the eccentric 43 to the wobble gear 72, wherein the wobble gear 72 is rolling on the stationary internal toothing 91 of the combined cover and guide plate 9 without intrinsic rotation. The wobbling movement caused by the rolling wobble gear 72 without intrinsic rotation is transmitted to the driven gear 71.

It is essential here that the ratios of the tooth numbers of the internal toothing 91 of the cover and guide plate 9 to the first external toothing 721 of the wobble gear 72 and the tooth numbers of the internal toothing 711 of the driven gear 71 to the second external toothing 722 of the wobble gear 72 differ from each other.

As can be taken from the perspective longitudinal section through the pre-assembly 5 with the alternative wobble gear transmission 7 according to FIG. 24, the wobble gear 72 supports on the combined cover and guide plate 9 in axial direction, so that even under high loads and in particular in the case of a crash the gear wheel pairs of the first external toothing 721 of the wobble gear 72 completely remain in engagement with the internal toothing 91 of the combined cover and guide plate 9 and the gear wheel pairs of the second external toothing 722 of the wobble gear 72 completely remain in engagement with the internal toothing 711 of the driven gear 71.

The pre-assembly 5 shown in FIG. 23 in the assembled condition is fixed as constructional unit by means of laser welding analogous to the exemplary embodiment shown in FIG. 9. Alternative types of connection between the housing cover 3 and the combined cover and guide plate 9 corresponding to FIGS. 13 to 15 also can be provided in this exemplary embodiment.

By means of the form-fit teeth 51, 52, 53 provided in pairs on the circumference of the combined cover and guide plate 9, which engage into the form-fit depressions 24, 25, 26 arranged at the edge of the second recess 28 of the housing shell 2, a positive connection is created between the pre-assembly 5 and the housing shell 2. The shaft 16 of the pre-assembly 5 engages into the opening 20 of the housing shell 2 and thus is mounted in the same and in the opening 610 of the driven gear 61.

When putting the combined cover and guide plate 9 onto the shaft 16, the segment arms 31 to 33 regularly distributed around the circumference of the edge of the housing cover 3 engage into the corresponding segment recesses 54, 55, 56 formed on the circumference of the combined cover and guide plate 9 and hence secure the location of the combined cover and guide plate 9 in radial direction.

After assembly of the pre-assembly 5, the pre-assembly 5 is fixed by means of welding seams 58 applied between the segment arms 31 to 33 of the housing cover 3 and the outer edge of the combined cover and guide plate 9, which preferably are made by laser welding.

Figure 25:
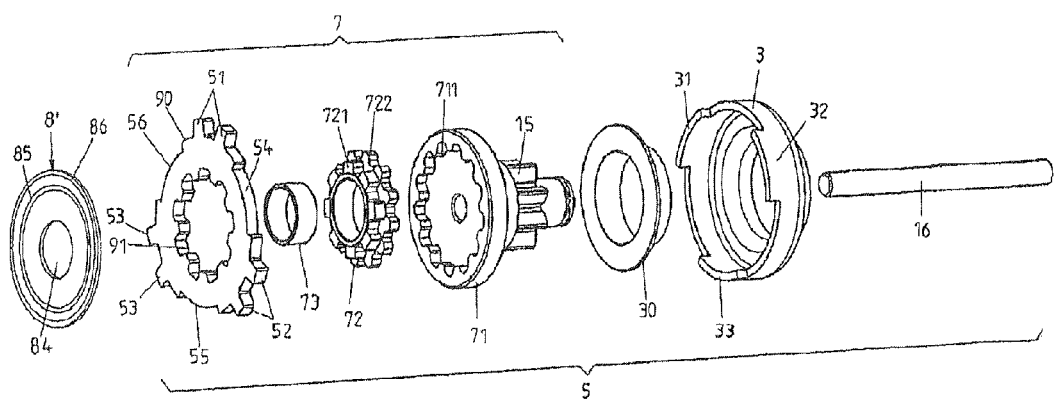
FIG. 25 shows a perspective exploded representation of a pre-assembly with an alternative wobble gear transmission with a guide means formed as toothing of a firmly mounted ring gear and an axially resilient cover plate.

In a perspective exploded representation analogous to the exploded representation of FIG. 22, FIG. 25 shows the alternative wobble gear transmission integrated into the pre-assembly 5 as second reduction gear stage, in which the combined cover and guide plate 9 is replaced by a guide plate 90 exclusively performing guide functions and by an axially resilient cover plate 8' analogous to the embodiment of FIGS. 16 to 21. The structure and function of the gear elements of the second reduction gear stage corresponds to the above-described structure and function of the wobble gear transmission of FIGS. 22 to 24, so that in this respect reference is made to the above description of these Figures.

When putting the axially resilient cover plate 8' onto the shaft 16, the interlocking edge 86 of the axially resilient cover plate 8' interlocks with the inner edge of the regularly distributed segment arms 31 to 33 of the housing cover 3 and hence secures the axial position of the gear elements 71, 72, 73, 55 of the alternative wobble gear transmission.

The invention claimed is:

1. An adjustment drive for an adjusting device of a motor vehicle seat, the adjustment drive comprising a drive motor, a two-stage reduction gear and a housing for mounting the drive motor and for accommodating the two-stage reduction gear in a housing shell of the housing, which can be closed by a housing cover,
   wherein the two-stage reduction gear comprises a first reduction gear stage and a second reduction gear stage and wherein the adjustment drive further comprises a coupling element connected with a second gear element of the first reduction gear stage, which coupling element can be brought into engagement with a first gear element of the second reduction gear stage,
   wherein the second reduction gear stage is arranged in a pre-assembly between the housing cover and a cover plate connected with the housing cover and is supported in axial direction, the pre-assembly forming a closed construction unit being connected to the housing shell.

2. The adjustment drive according to claim 1, wherein the housing shell includes:
   flange arms for accommodating the drive motor,
   a first recess for accommodating a first gear element of the first reduction gear stage connected with the motor shaft of the drive motor, and
   a second recess for accommodating a second gear element of the first reduction gear stage in engagement with the first gear element of the first reduction gear stage and a coupling element to the second reduction gear stage, which is connected with the second gear element of the first reduction gear stage.

3. The adjustment drive according to claim 2, wherein the second recess is pot-shaped and the pre-assembly has a substantially cylindrical outer contour whose outside diameter is adapted to the inside diameter of the second recess and wherein the pre-assembly as well as a further assembly including the second gear element of the first reduction gear stage and the coupling element can be inserted into the second recess.

4. The adjustment drive according to claim 3, wherein the pre-assembly inserted into the second recess can be fixed at the housing shell in an axial direction or wherein, for anti-rotation protection, the pre-assembly is insertable into the second recess or connectable with the housing shell with radial form fit and/or frictional contact.

5. The adjustment drive according to claim 1, wherein the first reduction gear stage comprises a self-locking worm-gear transmission with a drive worm connected with the motor shaft of the drive motor and a helical gear in engagement with the toothing of the drive worm, the drive worm being a first gear element of the first reduction gear stage and the helical gear being the second gear element of the first reduction gear stage.

6. The adjustment drive according to claim 1, wherein the housing cover is bell-shaped, includes an opening for accommodating a bushing for the axial guidance of the gear elements of the second reduction gear stage integrated into the pre-assembly and for supporting an output-side pinion for transmitting the output torque to a toothing of the adjusting device and an edge connected with the cover plate.

7. The adjustment drive according to claim 6, wherein the pre-assembly includes gear elements of a wobble gear transmission and the second reduction gear stage comprises the wobble gear transmission which wobble gear transmission comprises a driven gear with an internal toothing concentrically mounted on a shaft, wherein
   the pinion is connected with the driven gear,
   a wobble gear whose external toothing cooperates with the internal toothing of the driven gear, and
   a guide for the wobble gear including the cover plate.

8. The adjustment drive according to claim 7, wherein the guide for the wobble gear comprises:
   a cross-head slide which, with first guide elements aligned with each other, engages into first counter-guide elements of the wobble gear aligned with each other, and
   a guide plate which, with second guide elements aligned with each other and offset by 90° against the first guide elements of the cross-head slide, engages into second counter-guide elements of the cross-head slide aligned with each other and offset by 90° against the first guide elements of the cross-head slide.

9. The adjustment drive according to claim 1, further comprising an axially resilient cover plate, wherein the axially resilient cover plate is positively or non-positively connected with the guide plate or the housing cover, wherein the peripheral edge of the axially resilient cover plate is interlocked with an outer contour of the housing cover.

10. The adjustment drive according to claim 8, wherein the cover plate is connected with the guide plate by welding seams arranged offset to each other at a circumference of the cover plate.

11. The adjustment drive according to claim 1, wherein flanges radially protruding from a peripheral edge of the cover plate or an axially resilient cover plate are connected with segment arms formed on a circumference of the housing cover by screw connections or rivet connections formed as radial rivets which are mounted in insertion tabs of the flanges.

12. The adjustment drive according to claim 1, wherein a peripheral edge of the cover plate or an axially resilient cover plate partly is clipped with hooks protruding from an edge of the housing cover.

13. The adjustment drive according to claim 7, wherein the cross-head slide comprises:
- a plate with a central bore which merges into horizontally oriented guide slots aligned with each other, into which horizontally oriented guide noses of the wobble gear engage, which are aligned with the guide slots, and
- guide pins vertically oriented by 90° relative to the horizontal guide slots and protruding from a circumference of the cross-head slide, which engage into vertically oriented guide recesses of the guide plate aligned with each other and proceeding from a central bore of the guide plate, wherein the guide noses of the wobble gear have sliding guide surfaces on horizontal sliding surfaces of the guide slots, wherein the guide slots and the guide noses have such a length that the guide noses end with a small distance before a root diameter of the external toothing of the wobble gear, wherein the horizontal sliding surfaces of the guide slots and the guide surfaces have an axial length which is equal to an axial length or thickness of the cross-head slide.

14. The adjustment drive according to claim 13, wherein the guide noses of the wobble gear are connected with each other via a circumferential web on a periphery of the bore of the wobble gear.

15. The adjustment drive according to claim 8, wherein, on its end face facing the cross-head slide, the wobble gear has spacers formed as protrusions which define the distance of the end faces of the cross-head slide and wobble gear facing each other.

16. The adjustment drive according to claim 1, wherein the pre-assembly includes
- a driven gear with an internal toothing concentrically mounted on a shaft,
- a pinion connected with the driven gear for transmitting the driving torque to a toothing of the adjusting device,
- a wobble gear comprising a first external toothing which cooperates with the internal toothing of the driven gear, wherein a number of teeth of the first external toothing of the wobble gear and the internal toothing of the driven gear differs by at least one tooth and a tip diameter of the first external toothing of the wobble gear is smaller than a root diameter of the internal toothing of the driven gear by at least one tooth height, and a second external toothing with a smaller tip diameter as compared to the first external toothing, a bell-shaped housing cover with an opening for accommodating a bushing for the axial guidance of the gear elements of the wobble gear transmission integrated into the pre-assembly and for mounting the pinion,
- a guide plate with an internal toothing into which the second external toothing of the wobble gear engages, wherein a number of teeth of the second external toothing of the wobble gear and the internal toothing of the cover and guide plate differs by at least one tooth and a tip diameter of the second external toothing of the wobble gear is smaller than the root diameter of the internal toothing of the guide plate by at least one tooth height, and
- the cover plate or an axially resilient cover plate connected with an edge opposite the opening of the housing cover for axially supporting the gear elements integrated into the pre-assembly.

17. The adjustment drive according to claim 1, wherein the pre-assembly includes
- a driven gear with an internal toothing concentrically mounted on a shaft,
- a pinion connected with the driven gear for transmitting the driving torque to a toothing of the adjusting device,
- a wobble gear with a first external toothing which cooperates with the internal toothing of the driven gear, wherein a number of teeth of the first external toothing of the wobble gear and the internal toothing of the driven gear differs by at least one tooth and a tip diameter of the first external toothing of the wobble gear is smaller than a root diameter of the internal toothing of the driven gear by at least one tooth height, and with a second external toothing with a smaller tip diameter as compared to the first external toothing,
- a bell-shaped housing cover with an opening for accommodating a bushing for the axial guidance of the gear elements of the wobble gear transmission integrated into the pre-assembly and for mounting the pinion, and
- a combined cover and guide plate connected with an edge opposite the opening of the housing cover for axially supporting the gear elements integrated into the pre-assembly, which includes an internal toothing into which the second external toothing of the wobble gear engages, wherein a number of teeth of the second external toothing of the wobble gear and the internal toothing of the combined cover and guide plate differs by at least one tooth and a tip diameter of the second external toothing of the wobble gear is smaller than a root diameter of the internal toothing of the combined cover and guide plate by at least one tooth height.

18. The adjustment drive according to claim 16, wherein the tip diameter of the first external toothing of the wobble gear and the root diameter of the internal toothing of the guide plate or of the combined cover and guide plate are dimensioned such that the wobble gear supports on the guide plate or the combined cover and guide plate in axial direction.

19. The adjustment drive according to claim 17, wherein the guide plate or the combined cover and guide plate includes peripheral form-fit teeth which engage into form-fit depressions of the housing shell, wherein the form-fit teeth of the guide plate or the combined cover and guide plate protrude in pairs at right angles to each other from the circumference of the guide plate or the combined cover and guide plate and positively engage into the form-fit depressions at the edge of the second recess of the housing shell, or the form-fit teeth are unsymmetrically distributed on a circumference of the guide plate or the combined cover and guide plate.

20. The adjustment drive according to claim 17, wherein the cover plate or the combined cover and guide plate is connected with the housing cover by first welding seams arranged offset to each other at the circumference.

* * * * *